April 2, 1968  K. E. LAKE  3,375,531

FLUSH VALVE

Filed Oct. 18, 1965

KENNETH E. LAKE
INVENTOR

Huebner & Worrel
ATTORNEYS

United States Patent Office 3,375,531
Patented Apr. 2, 1968

3,375,531
FLUSH VALVE
Kenneth E. Lake, Dos Palos, Calif., assignor, by direct and mesne assignments, to Lake-Dermer, Inc., a corporation of California
Filed Oct. 18, 1965, Ser. No. 496,849
6 Claims. (Cl. 4—57)

ABSTRACT OF THE DISCLOSURE

A flush valve for a water closet having a main discharge conduit providing a housing having a compartment disposed within the closet in covering relation to the main discharge conduit with a pair of evacuation conduits upwardly extended from the housing and terminating in elevationally spaced upper ends and including an overflow tube extended through the housing mounting closure members individual to the evacuation conduits and having a lower end directly connected to the main discharge conduit to provide a water filling passage independently of the passage provided for the evacuation conduits through the housing.

Disclosure

It is recognized that the device of the present invention may have other applications in metering the flow of fluids. However, for illustrative convenience its application as a flush valve for toilet tanks is described as indicative of its utility.

In certain areas of the world with rapidly increasing populations, the shortage of water is becoming increasingly critical. The problem is aggravated by periods of draught. Occasionally in these areas it is necessary to charge individuals according to the amounts of water used or to ration water in order to limit its use and thus conserve the available supply.

Conventional toilets consume large quantities of water due to their repetitious flushing and significantly contribute to the shortage of water. In order to alleviate this problem, flush valves have heretofore been devised which may be selectively operated to use a minimum amount of water for each flushing operation. However, these devices have proved unsatisfactory in many respects. In order most effectively to conserve water, they must receive general acceptance and wide spread use. However, since these prior devices have not been readily adaptable to conventional toilets, the installation of a special toilet or at least a special water tank which is already fitted with the flush valve has usually been required. Obviously this is not economically feasible in many instances. Thus, the few special toilets which are so equipped and sold conserve an inconsequential amount of water. Moreover, most of these prior flush valves have been rather complex, not fully dependable in operation, and not readily adaptable to mass production techniques. Further, they require frequent repairs and adjustments to maintain proper working order. The valve of the present invention is intended to eliminate these and other problems inherent to conventional flush valves.

It is therefore an object of the present invention to provide an improved flush valve which can be employed to conserve water.

Another object is to provide such a flush valve which is easy to install in the water tanks of conventional toilets.

Another object is to provide a flush valve which is of simple construction and is susceptible to mass production.

Another object is to provide a flush valve which is of durable construction and is thus operably dependable.

Another object is to provide a flush valve which is capable of effective operation at substantially less than its optimum full capacity.

A further object is to provide a flush valve which is inexpensive to construct.

A still further object is to provide a flush valve which requires a minimum of maintenance.

These, together with other objects and advantages, will become more fully apparent upon reference to the following description and accompanying drawings.

Figure 2:
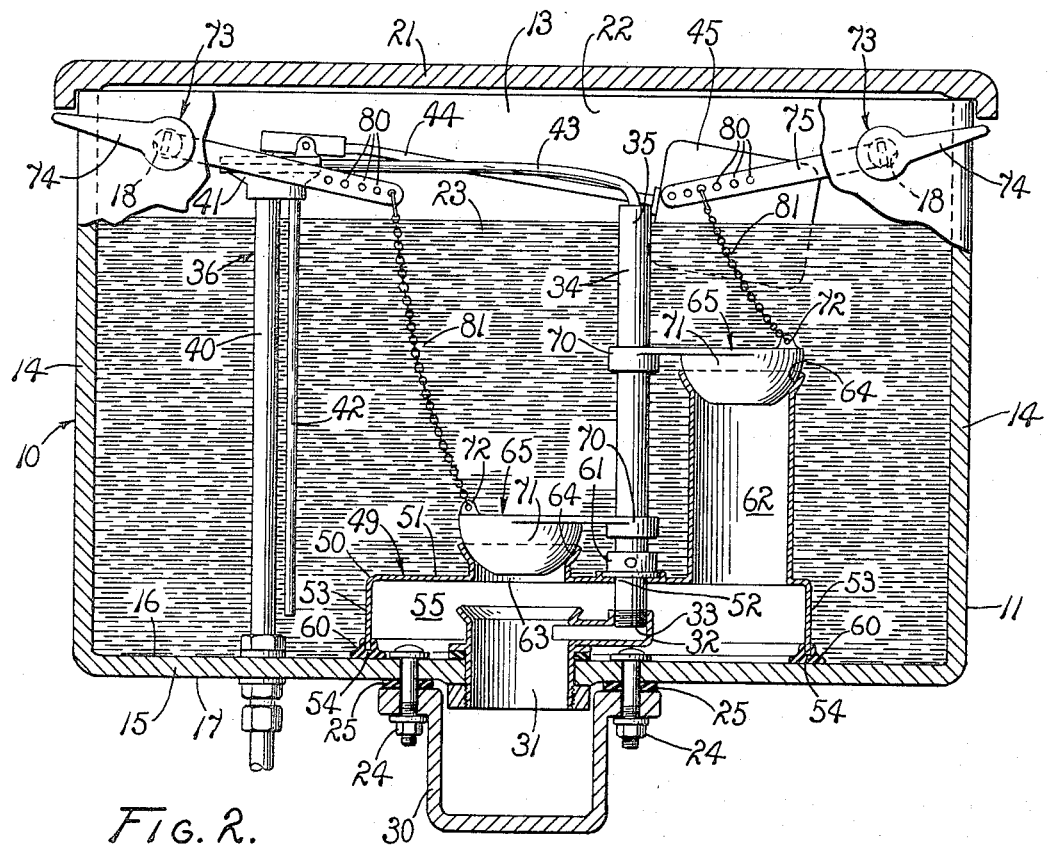
FIG. 2 is a central vertical section through the flush valve and water closet of FIG. 1.

Referring in greater particularity to the drawings, a conventional water closet is generally indicated at 10. The water closet includes a tank 11 having continuous front wall 12, rear wall 13, end walls 14, and a bottom wall 15 having inner and outer surfaces 16 and 17, respectively. Mounting holes 18 are provided in the upper corners of front wall 12. The tank includes a lid 21 which combines with the walls to define a chamber 22. In use, the chamber contains water 23, as shown in FIG. 2. The water closet is mounted in the conventional manner through the use of nut and bolt assemblies 24 and gaskets 25 on a supply conduit 30 of a conventional toilet bowl, not shown. A main discharge conduit 31 is provided in the bottom wall which communicates between the chamber of the water closet and the supply conduit 30 of the toilet bowl. An overflow fitting 32 is rigidly mounted at one end in communicating relation to the discharge conduit and provides at its distal end an upwardly facing internally threaded socket 33. An upright cylindrical overflow tube 34 of predetermined length is screw-threadably received in the internally threaded socket of the fitting and provides an upper end 35.

A conventional inlet valve assembly is generally indicated at 36. The assembly includes a vertical water pipe 40 connected to an external source of water under pressure and extends within the chamber 22 to a position above the upper level of the water 23. An inlet valve 41 is mounted on the upper end of the water pipe. A chamber filler tube 42 is downwardly extended from the inlet valve in substantially parallel relation to the water pipe and terminates adjacent to the inner surface 16 of the bottom wall 15. A toilet bowl filler tube 43 is substantially horizontally extended from the inlet valve and is downwardly bent into the upper end 35 of the overflow tube 34. A float arm 44 is pivotally mounted on the inlet valve and provides at its distal end a float 45 which rests on the surface of the water 23 for operating the valve in the well-known manner. The structure now described is conventional and constitutes an illustrative environment for the flush valve of the present invention.

Figure 1:
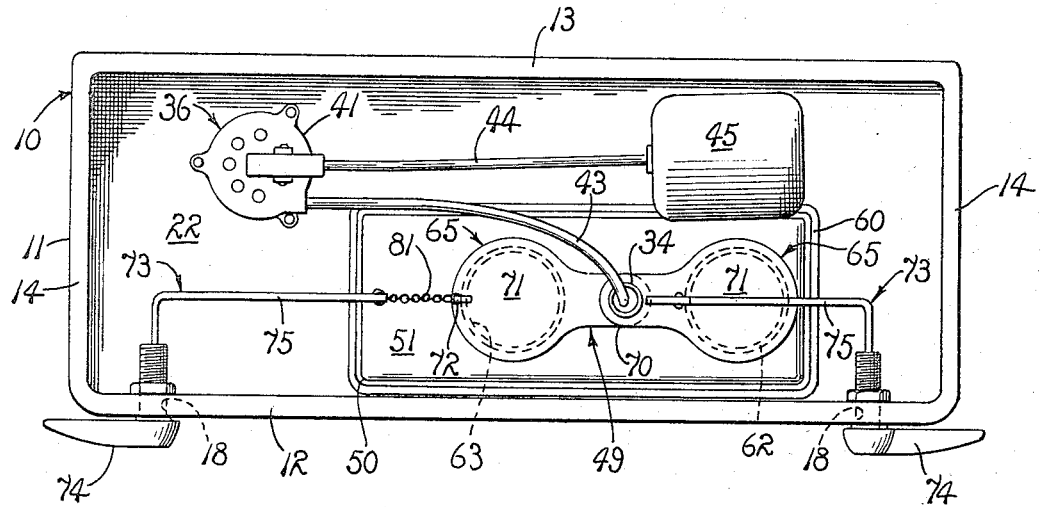
FIG. 1 is a top plan view of the flush valve of the present invention installed in a water closet.

A discharge valve assembly is generally indicated in FIGS. 1 and 2 at 49. The discharge valve assembly provides a rectangular housing 50 on the overflow tube 34. The housing includes a top wall 51 having an orifice 52 and side walls 53 having lower edges 54. The top wall and side walls define a compartment 55. A seal 60 of resiliently compressible material is mounted on the lower edges of the side walls. The overflow tube extends through the orifice of the housing with the housing and seal in sealing relation against the bottom wall 15 of the tank 11. A sealing ring 61 is received about the overflow tube and locked against the top wall of the housing to maintain the housing in its sealed attitude with respect to the wall 15 and to seal the orifice about the overflow tube.

An upright minimum evacuation conduit 62 of a predetermined length is mounted on the top wall of the housing 50 in communication with the compartment at one side of the orifice. An upright maximum evacuation conduit 63 of a shorter length than the conduit 62 is mounted on the top wall in communication with the compartment of the housing on the other side of the orifice. Both evacuation conduits provide valve seats 64 at their distal ends.

Two flexible and compressible float valves 65 of rubber or other suitable material serve as closure means and consist of mounts 70, floats 71, and flanges 72. The mounts of each of the float valves are affixed about the overflow tube 34 opposite the valve seat of a predetermined evacuation tube and with the float of each valve being seated in its appropriate valve seat, as shown in FIG. 2. Thus, when the floats are in their valve seats, the distal ends of the evacuation tubes are sealed against the passage of water therefrom.

Flushing mechanism or actuating means 73, each including a hand lever 74 and a lever arm 75 of well-known form are pivotally mounted in each of the holes 18 in the upper corners of the front wall 12 with each hand lever on the exterior of the tank 11 and its respective lever arm in the interior of the tank. Each of the lever arms provides a plurality of adjustment holes 80. The flush mechanisms are mounted so that they may be pivoted through arcs of predetermined magnitude between stops, not shown. An operating chain 81 is connected between each of the flanges 70 and its respective lever arm, as shown in FIG. 2.

*Operation*

The operation of the described embodiment of the subject invention is believed readily apparent and is briefly summarized at this point. The device may be embodied in completed form in a new toilet or water closet or it may be supplied as a conversion kit so that old toilets may be converted. When an old toilet is to be converted, the original discharge valve assembly which is not shown or described herein must be removed from the chamber 22. However, usually the overflow tube 34 of the original device may be retained. The original hole provided in the side wall for the flushing handle may be used to mount one of the flush mechanisms 73. However, a new hole 18 is drilled in the opposite upper corner of the side wall to mount the other flush mechanism. Subsequently, the flush valve of the present invention is mounted within the tank 11, as described.

When only a minimum amount of water is needed for flushing the toilet, the hand lever 74, as shown on the right in FIG. 2, in operable connection with the float valve 65 of the minimum evacuation conduit 62 is pivoted in a clockwise direction. This causes its lever arm 75 also to pivot in a clockwise direction thus pulling its chain 81 and as a result unseating its float valve 65. Consequently all of the water 23 above the valve seat 64 flows through the minimum evacuation conduit, compartment 55, the discharge conduit 31, and into the supply conduit 30 for the flushing of the toilet. When the float valve is unseated, it floats in the water above the conduit. As the water level lowers to a point even with the valve seat of the conduit, the float reseats itself in the valve seat thus resealing the conduit.

As the water level is lowered, the float 45 and the floating float arm 44 are lowered accordingly until the inlet valve 41 is opened. This allows water to flow through the chamber filler tube 42 in order to fill the chamber 22. Simultaneously this allows water to flow through the bowl filler tube 43 and into the overflow tube 34, the overflow fitting 32, the discharge conduit 31, and the supply conduit 30 in order to refill the toilet bowl after flushing. When the water level in the chamber reaches a predetermined level the floating float arm 44 closes the inlet valve in the conventional manner.

If a maximum amount of water 23 is needed for the flushing operation, the hand lever 74, as shown on the left in FIG. 2, in operable connection with the float valve 65 of the maximum evacuation conduit is pivoted in a counterclockwise direction. This unseats the float valve and the water is permitted to drain out the maximum evacuation conduit 63 until the water level descends to the valve seat and thus a much greater volume of water is released than when water is released through the minimum evacuation conduit 62. As before, the float valve then settles into position on its valve seat and the tank is again filled for subsequent use.

The distance the floats are lifted above their valve seats 61 may be adjusted by selectively connecting the chains 81 in the adjustment holes 80.

Thus is provided a flush valve for conserving water which is adaptable for installation in conventional toilets. It makes possible the institution of water conservation programs on a mass scale. Since the device is inexpensive and easy to install, it is adaptable to required installation in areas of water deficiency. Furthermore, the device is readily adaptable to mass production, economical availability, and low cost installation. Both float valves 65 and both flush mechanisms 73 are of the same construction requiring only that they be positioned correctly with respect to the other elements during assembly in order to work properly. Construction costs are further reduced since only one type of float valve and one type of flush mechanism must be formed. Moreover, merchants need to keep one type of float valve and one type of flush mechanism in stock. The other elements of the device may be formed using standard construction procedures.

Finally and perhaps most important the device is of uncomplicated durable construction unlike most of the flush valves of this type thus giving it a long trouble-free operating life. For example, even if one of the evacuation conduits 62 or 63 were to become clogged anywhere throughout its length, the other evacuation conduit would operate to flush the toilet satisfactorily until the conduit could be repaired while in no way hindering the operation of the overflow tube 34 in refilling the toilet bowl after flushing.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A flush valve for a water closet having a main discharge conduit, comprising a housing having a compartment disposed within the closet in covering relation to the main discharge conduit; an overflow tube connected to the main discharge conduit and upwardly extended through the housing, said housing including a pair of integral evacuation conduits upwardly extended therefrom providing open upper ends in elevationally spaced relation in the closet; float valves individual to the evacuation conduits mounted on the overflow tube in closing relation to their respective evacuation conduits; and a pair of flushing mechanisms individually connected to the float valves selectively to open said evacuation conduits to allow a respectively different predetermined volume of water substantially instantaneously to drain from the water closet with a minimum of restriction through the compartment and the main discharge conduit in by-passing relation to said overflow tube.

2. A flush valve for a water closet having a bottom wall providing a main discharge conduit, comprising an elongated substantially rectangular housing having an upper wall and integral side walls defining a relatively large volume compartment with the walls providing a continuous lower edge disposed in sealing engagement with the bottom wall of the closet in spaced circumscribing covering relation to the discharge conduit of the closet; an overflow tube extended through the upper wall of the housing in upwardly extended relation therefrom and having a lower end extended into said compartment for direct connection to the discharge conduit, said housing including a pair of integral evacuation conduits communicated with said compartment in the housing and having upper ends disposed in elevationally spaced relation within the closet; a pair of float valves of resiliently flexible material individual to the evacuation conduits having ends individually mounted on the overflow tube and integral opposite float ends disposed in normally fluid sealing relation to the upper ends of their respective evacuation conduits but flexing between their ends to open said evacuation conduits; and a pair of flushing mechanisms pivotally mounted in spaced relation on the closet and individually connected with said float ends of the float valves selectively to raise the float ends from their respective evacuation conduits to allow the volumes of water in the closet above the upper end of the selected evacuation conduit substantially instantaneously to drain therethrough with a minimum of resistance and in by-passing relation to said overflow tube.

3. A flush valve for a water closet comprising a main discharge conduit from the closet having an end extended inwardly of the closet and a radially offset overflow tube fitting integral therewith; a housing having a compartment disposed within the closet in covering relation to the main discharge conduit and to said fitting and including a pair of integral evacuation conduits upwardly extended in spaced relation therefrom providing open upper ends elevationally spaced within the closet and communicating with said compartment within the housing; an overflow tube extended through the housing between said evacuation conduits and having an end connected to said fitting within the compartment and an opposite end upwardly extended from the housing; a pair of float valves of resiliently flexible material having ends individually mounted on said overflow tube and opposite float ends individually disposed in closing relation to the upper ends of their respective evacuation conduits; a pair of flushing mechanisms individually connected to said float ends of the valves selectively to flex them upwardly for opening the evacuation conduits to permit a respectively different predetermined volume of water to drain from the water closet through the compartment and into the main discharge conduit; and a toilet bowl filler tube connected to a source of water under pressure and extended downwardly through said overflow tube to discharge water directly into said main discharge conduit through said fitting independently of the discharge of water from the evacuation conduits through the compartment.

4. A flush valve attachment, for a water closet which has a tank providing a bottom wall having a main discharge conduit extended therethrough and an overflow tube upwardly extended in offset relation from the main discharge conduit and in communication therewith, comprising a housing having an open bottom, an opposite upper orifice, and being adapted to be inserted into the water closet with the overflow tube extended through said orifice to permit the housing to slide downwardly over the main discharge conduit of the water closet; a pair of evacuation conduits integral with the housing, upwardly extended therefrom, and communicating with the interior of the housing and said main discharge conduit and having upper ends disposed in elevationally spaced relation to the housing and to each other; float valves individual to the evacuation conduits individually releasably mounted on the overflow tube and disposed in normally fluid sealing relation to the upper ends of their respective evacuation conduits; a pair of flush mechanisms pivotally mounted in spaced relation on the closet and individually connected to the float valves; seal means continuously extended about the bottom of said housing; and fastener means releasably mounted on the overflow tube and compressing said seal in tightly sealing engagement between the bottom of the housing and the bottom wall of the water closet.

5. The attachment of claim 4 in which said housing has an upper wall and integral side walls providing a continuous lower edge mounting said seal means, and said orifice being disposed in said upper wall of the housing between said evacuation conduits slidably to receive said overflow tube during installation of the housing in said water closet.

6. The attachment of claim 5 wherein said float valves are constructed of resiliently flexible material and have opposite ends providing floats sealably engaging the upper ends of the evacuation conduits and mounting ends, said valves flexing intermediate their ends to open and close their respective evacuation conduits incident to selective manipulation of said flush mechanisms.

References Cited

UNITED STATES PATENTS

| | | | |
|---|---|---|---|
| 1,767,043 | 6/1930 | Blaun et al. | 4—67 |
| 1,780,810 | 11/1930 | Brown | 4—67 |
| 2,731,647 | 1/1956 | Groth et al. | 4—67 |
| 2,754,521 | 7/1956 | Marcum | 4—67 |
| 2,776,437 | 1/1957 | Detjen | 4—57 |
| 2,779,028 | 1/1957 | Branch | 4—57 |
| 2,925,608 | 2/1960 | Gresham | 4—57 |
| 2,940,084 | 6/1960 | Fabbi et al. | 4—57 |

LAVERNE D. GEIGER, *Primary Examiner.*

D. MASSENBERG, *Assistant Examiner.*